United States Patent

[11] 3,613,495

| [72] | Inventor | Henry J. Podgursky<br>64 Reyam Road, Lynbrook, N.Y. 11563 |
|---|---|---|
| [21] | Appl. No. | 847,986 |
| [22] | Filed | Aug. 6, 1969 |
| [45] | Patented | Oct. 19, 1971 |

[54] FASTENER MEANS INCLUDING AN INTERIOR EXPANSIBLE CORE
5 Claims, 12 Drawing Figs.

[52] U.S. Cl............................................. 85/65,
29/421, 29/509, 29/522
[51] Int. Cl................................................ F16b 13/04
[50] Field of Search............................................ 85/65, 63, 70

[56] References Cited
UNITED STATES PATENTS

| 2,030,167 | 2/1936 | Miller | 85/70 |
|---|---|---|---|
| 3,485,282 | 12/1969 | Lopez et al. | 85/63 |
| 2,492,605 | 12/1949 | Varney et al. | 85/65 |
| 2,842,022 | 7/1958 | Semmion | 85/65 |
| 3,091,053 | 5/1963 | Growald | 264/45 |
| 3,213,743 | 10/1965 | Campbell | 85/65 |
| 3,270,793 | 9/1966 | Polmon | 85/70 |

*Primary Examiner*—Edward C. Allen
*Attorney*—Polachek & Saulsbury

ABSTRACT: A hollow rivet includes a casing containing an expansible core which when heated or subjected to pressure deforms the casing to lock apertured parts together. The core contains a thermosetting resin plastic, and a metal substance dispersed throughout the core to increase thermal conductivity of the core to facilitate setting of the resin plastic and to increase rigidity of the core when the resin plastic sets.

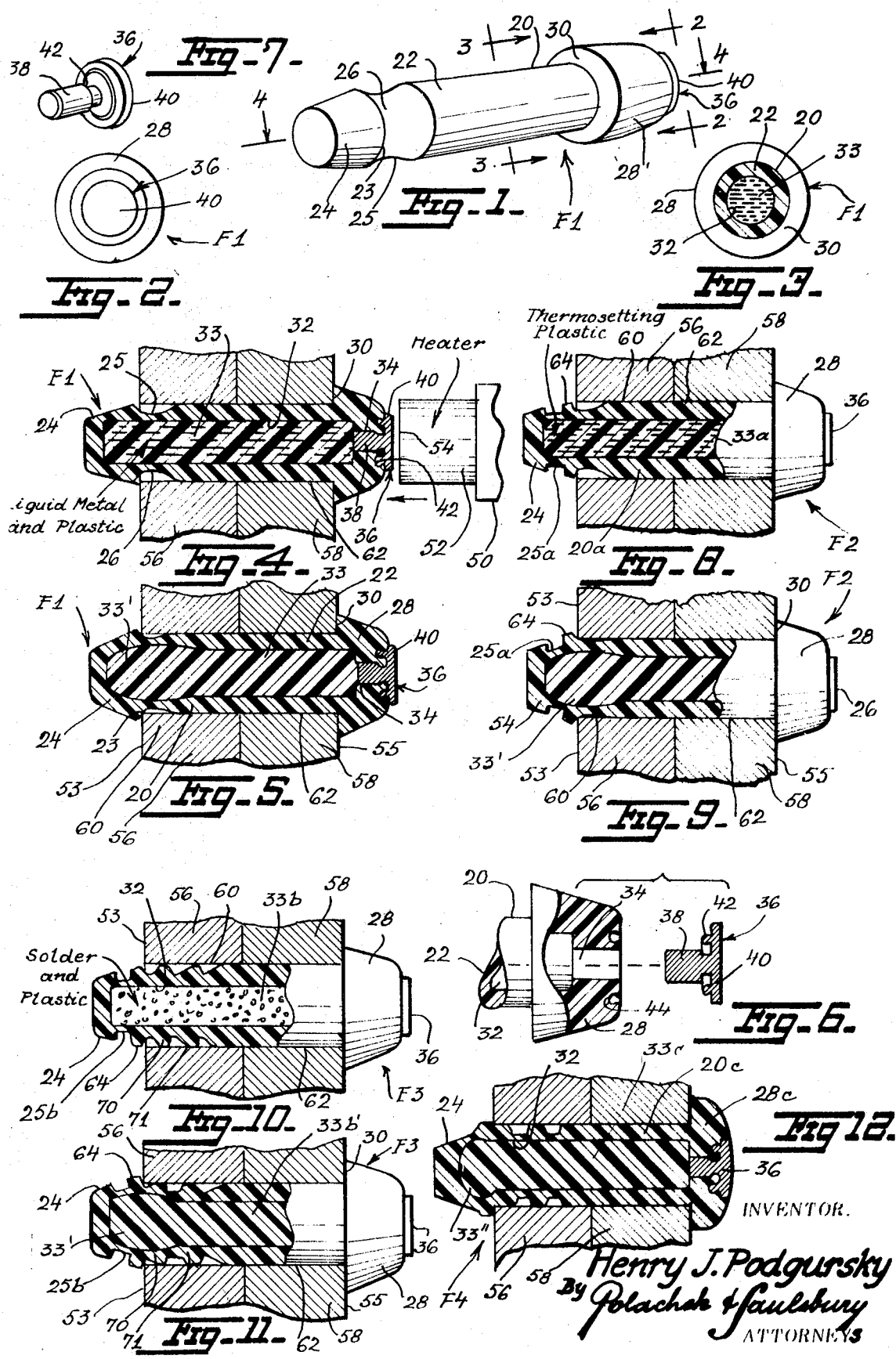

FASTENER MEANS INCLUDING AN INTERIOR EXPANSIBLE CORE

This invention relates to the art of fasteners of the type which is inserted into registering holes of a plurality of members and which is then expanded at one or both ends to secure the parts together. Such fasteners are generally characterized as blind rivets.

It has been proposed heretofore in the art of which U.S. Pat. Nos. 2,492,590 and 3,213,743 are typical, to fill a fastener casing with an incompressible liquid such as water, oil or other hydraulic fluid and then to apply pressure to the liquid to expand or deform the casing the thus form a joint between two or more abutted parts. In such a construction the liquid drains out of the casing through an opening in one end through which pressure is applied. If water, oil and other liquid is used in a closed casing the liquid generally leaks out through holes or cracks in the casing caused when the casing is deformed. In any case the liquid is not relied upon to complete the joint which depends on the deformation of the casing alone.

In the present invention a different approach has been taken to fasteners of the type described. According to the invention a tubular deformable casing has a core formed of a rigid or semirigid substance which when heated or subjected to pressure flows to deform the casing. The core then solidifies or assumes a semirigid state to serve as internal rein for cement of the casing. The core can contain a thermosetting resin material such as an epoxy or acetate which can be filled with lead, copper, iron, zinc, antimony, or other metal in powdered or pellet form to increase thermal conductivity of the core to facilitate setting of the resin material while being heated, and to strengthen the core after the resin material sets. Metal alloys such as brass can be used as fillers of the core. Mercury can also be used.

The casing containing the core has a generally cylindrical section formed with heads at opposite ends. At one end the head is joined to the cylindrical section via a neck having one or more circumferential grooves and ribs. The ribs lock the fastener in place. The head at the other end contains a rigid, thermally conductive plug. This serves as a conductor for applied heat, as a stopper to hold liquid contents of the casing inside the casing, as a pad to receive an applied force directed against the fastener, and as a guide around which the head in which it is set deforms.

The invention will be explained in further detail in connection with the drawing, wherein:

FIG. 1 is a perspective view of a fastener embodying the invention.

FIG. 2 is an end view taken on line 2—2 of FIG. 1.

FIG. 3 is a cross-sectional view taken on line 3—3 of FIG. 1.

FIG. 4 is a longitudinal sectional view taken on line 4—4 of FIG. 1, the fastener being shown inserted in registering apertures of two plates to be secured together.

FIG. 5 is a view similar to FIG. 4, showing the fastener after deformation of casing and core has been effected.

FIG. 6 is an enlarged, exploded sectional view of parts of the fastener before assembly.

FIG. 7 is a perspective view of a plug or cap employed in the fastener.

FIG. 8 and FIG. 10 are sectional views similar to FIG. 4 showing two other fastener constructions.

FIGS. 9 and 11 are sectional views similar to FIG. 5 but showing the fasteners of FIGS. 8 and 10 respectively after deformation of the casing and core.

FIG. 12 is a sectional view similar to FIG. 11 showing another way the casing and core can be deformed.

Referring first to FIGS. 1–4, there is shown a fastener F1 having a tubular casing 20. The casing has a cylindrical central section or shank 22. A frustoconical head 24 is formed at one end. The wider end of head 24 is equal to that of shank 22. A neck 25 joins the wider end of head 24 integrally to the shank 22. The neck is defined by a circumferential groove 26 which is arcuate in cross section as clearly shown in FIGS. 1 and 4. At the other end of the shank is another frustoconical head 28 which is larger than head 24. The wider end of head 28 is larger in diameter than the shank to define an annular radially extending seat 30 whose plane is perpendicular to the axis of the casing. The casing has a generally cylindrical cavity or chamber 32 which is filled with a core 33 which in this instance may be a liquid metal such as mercury mixed with a liquid thermosetting plastic such as an acetate, epoxy, or the like. The liquid metal has high thermal conductivity and facilitates setting of the plastic material. An axial hole 34 in head 28 communicates with chamber 32 and contains a plug 36. This plug has a cylindrical body 38 which fills hole 34 and terminates in a flat cap or head 40 at the outer end of head 28. A circumferential rib 42 at the inner side of cap 40 is undercut and engages in locking engagement with groove 44 in the end of head 28; see FIGS. 4, 6 and 7. The plug is engaged with head 28 by forcing it on the head. The rib 42 will snap into groove 44 in the pliable head. The plug is placed on head 28 after chamber 32 is filled with the highly viscous or semirigid substance which forms core 33.

A suitable heating instrument 50 similar to a soldering iron with a cylindrical tip 52 having a flat end 54 is applied to plug 36 as indicated in FIG. 4. This has the effect of transferring heat to core 33. Casing 20 is preferably made of a thermally insulative pliable synthetic resin material such a polytetrafluorethylene or other fluorethylene. The core material has a higher coefficient of thermal expansion than the casing and in addition preferably takes on a permanent set and solidifies in its expanded and cooled state. Thus when heat is applied to the casing at one end viscous core 33 expands at the other end radially where the wall is thinnest, namely at neck 25 to form an expanded bulb 33. This forces the annular faces 23 and 30 of heads 24 and 28 against opposite external sides 53, 55 of flat juxtaposed members 56, 58 having registering holes 60, 62 in which casing 20 is inserted. In this way members 56 and 58 are secured together.

In FIG. 8 fastener F2 has a core 33a formed of unplasticized thermosetting plastic material which expands when setting upon application of heat to plug 36. This secures tubular casing 20a in aligned holes 60, 62 of members 56, 58 to secure them together as shown in FIG. 9. An annular rib 64 is provided on neck 25 to form an abutment when the fastener expands as shown in FIG. 9.

In FIG. 10 fastener F3 has a core 33b formed of metal pellets mixed with unplasticized thermosetting plastic material which expands when setting. A plurality of further ribs 70, 71 are formed in the extended neck 24b of the casing. Other parts corresponding to those of fasteners F1 and F2 are identically numbered. When heat is applied the lead or other metal melts first and conducts and distributes the heat throughout the thermosetting plastic material which expands and solidifies to form a solid core body 33b' as shown in FIG. 11. The metal increases the rigidity of the core body. The ribs 70 effectively grip the wall inside hole 60 in addition to the engagement of rib 64 at end face 53 and seat 30 at end face 62. The bulb 33 keeps the casing in the expanded condition shown in FIG. 11.

FIG. 12 shows fastener F4 which is similar to fastener F3. Casing 20c is made of a pliable material line casing 20. Core 33c is made of thermosetting plastic. The fastener secures members 56 and 58 together after both heat and pressure are applied. The heat and pressure expand core 33c and also flatten and spread head 28c. Bulb 33'' is larger than bulb 33' in FIGS. 5, 9, and 11 because the right end of chamber 32 is displaced to the left and is located parallel to end face 55 of member 58. This larger bulb causes the casing to engage member 56 more effectively than when the bulb is smaller as in fasteners F1–F3. Application of pressure in addition to heat has the effect then of causing more expansion at head 24 which may be desirable in some cases.

In all forms of the invention described, the casing is deformable by expansion of the core in its internal chamber 32'. The deformation of the casing is maintained in some instances by the expanded core, but in all cases the permanently expanded core reinforces the casing. The expanded core is in a solid or almost solid state so that it cannot evaporate or leak out to weaken the fastener as occurs with fasteners having all liquid cores.

What is claimed is:

1. A fastener for abutted members having registering apertures, comprising a tubular casing having a generally cylindrical section with heads at opposite ends thereof, said casing having an internal cylindrical chamber; a core filling said chamber and comprising a thermosetting resin plastic material which expands when heated and which retains its expanded condition when cooled, and a metal substance distributed throughout the core to increase thermal conductivity to facilitate setting of the resin plastic when heat is applied, and to increase rigidity of the core when the resin plastic material sets, said casing being made of a pliable resin plastic material to deform at one end thereon when the core expands and to retain its deformation due to the expanded condition of the core, the material of said casing being less thermally conductive than said core and having a lower coefficient of thermal expansion so that the core expands the casing when heated, one of the heads at one end of the casing having a diameter not greater than that of said cylindrical section to pass through said registering apertures in said members, the other one of said heads having a maximum diameter greater than that of said section to bear on one of said members while an expanded portion of said section at said one head engages the other one of said members; and a thermally conductive plug set in said other head and exposed thereat to conduct heat to the core from an external source applied to the plug to set and expand the core.

2. A fastener as defined in claim 1, wherein said metallic substance has the form of pellets of metal.

3. A fastener as defined in claim 1, wherein said metallic substance has the form of a liquid metal.

4. A fastener as defined in claim 1, wherein said one head is joined to said section by neck of reduced diameter so that the core expands at said neck to form a bulbous portion to engage said other member.

5. A fastener as defined by claim 4, wherein said neck is further formed with at least one circumferential rib to engage at the aperture in said other member.